April 12, 1966     G. C. DEVOL ET AL     3,246,219
FERRORESONANT DEVICES

Filed May 3, 1957     2 Sheets-Sheet 1

INVENTORS
George C. Devol
Maurice J. Dunne
BY
Paul S. Martin
ATTORNEY

April 12, 1966     G. C. DEVOL ETAL     3,246,219
FERRORESONANT DEVICES Filed May 3, 1957     2 Sheets-Sheet 2

INVENTORS
George C. Devol
Maurice J. Dunne
BY
Paul S. Martin
ATTORNEY

United States Patent Office 3,246,219
Patented Apr. 12, 1966

3,246,219
FERRORESONANT DEVICES
George C. Devol, Greenwich, and Maurice J. Dunne, Danbury, Conn.; said Dunne assignor to said Devol
Filed May 3, 1957, Ser. No. 656,849
25 Claims. (Cl. 318—18)

The present invention relates to ferromagnetic devices, including magnetic detectors and coincidence detectors, and apparatus using such detectors.

Apparatus employing magnetic pick-up heads have for long been known in which a magnetic pick-up is employed to detect a magnetic field or a ferromagnetic body or a gap between two such bodies. This is utilized to special advantage in automatic control systems in Patent No. 2,590,091, issued to George C. Devol, one of the inventors named herein. Many other examples of such magnetic pick-ups are also well known to the art, as in magnetic follow-up devices, proximity detectors, flaw detectors, etc., in which no relative movement is required in the detection process between the pick-up head and the object or space being sensed. Accordingly, this may be called a static magnetic pick-up. Other pick-ups are used in sound recorders, and in some forms of computing machines, where travel of a magnetic record past the pick-up head induces a pulse or a series of waves. The present invention is concerned basically with the static form of pick-up head, which responds to a magnetic field itself rather than the rate-of-change of a magnetic field. However, as will be seen, the static pick-up head does not require that both the pick-up head and the object being sensed shall be at rest, since sensing during relative motion is readily feasible; and furthermore, some forms of static pick-ups can be utilized as induction pick-ups.

The need for high-level output from the pick-up head itself will be readily appreciated when it is recognized that in certain applications, many pick-up heads are required in order to achieve a single control result. Thus, in a magnetic digital-to-analog converter, many pick-up heads may be required to detect a single coded value. It is obviously of considerable importance to minimize the need for amplifiers and other comparable devices in order to extract and utilize the significant output of a magnetic pick-up head used in such a system. Accordingly, an important object of the present invention is to provide a new and improved magnetic pick-up head, and more particularly to provide novel magnetic pick-ups having high-level output.

In application Serial No. 474,574, filed December 10, 1954, by said George C. Devol, now Patent No. 2,988,237, issued June 13, 1961, there is disclosed an automatic control system in which a magnetic analog-to-digital converter is mechanically coupled to a work device such as an article transfer head, and a magnetic memory drum having a sequence of position codes recorded thereon is used to control the operation of the article transfer head with a high order of precision. One of the functions involved in the operation of such a device is the detection of coincidence between the position of the article transfer head, or rather, the analog-to-digital converter coupled thereto, and the magnetic memory. Accordingly, a further object of the present invention is to simplify and improve such systems, and to provide improved coincidence detectors or comparison devices. A further object of the present invention is to devise new and improved automatic magnetic control apparatus. In some forms of the improved system, a comparison device or coincidence detector is utilized directly to detect identity between the code magnetically recorded in the memory and the position of a read-out device forming part of an analog-to-digital converter.

In carrying out certain of the objects above, a number of magnetic detectors have been devised, as described in detail below, in which the phenomenon of ferroresonance plays a controlling role. This phenomenon is identified with saturable-core coils. Iron core inductors, particularly those having a sharp knee in their saturation curve and preferably those having high permeability between the saturation limits, exhibit the property or phenomenon of "jumping," as has been known for many decades. An iron-core coil has obviously an amount of inductance which depends upon the number of turns of wire, the core material employed, the frequency and amplitude of the alternating current signal impressed on the coil, and various other factors such as the circuit networks in which the devices are employed. For example, it is well known that as the alternating current voltage impressed on the coil of a ferromagnetic device increases, where the frequency is above the resonant frequency of the coil when unsaturated, the current gradually increases in direct proportion, so long as the saturation of the iron core has not been reached; but when a certain degree of saturation of the core is reached and the value of inductance changes critically, there is a "jumping" of the current level. The current through the coil abruptly rises to a much larger value than previously. This occurs when the distributed capacitance, together with any circuit capacitance identified with the iron core inductor, becomes resonant with the new and reduced value of inductance of the coil when saturated. Ferromagnetic devices that exhibit this property have a double-valued curve of applied voltage against current, with a negative slope between two positive slopes. This has been utilized in various computer circuits, for example, in which pulses are used to kick the non-resonant device through the negative slope portion of its characteristic, and into stable high-current operation, or the reverse.

In accordance with a broad feature of the present invention, this "jumping" phenomenon of ferroresonance is employed in the detection of magnetic fields. A ferroresonant device is employed with an excitation frequency above that at which it is resonant in the specific embodiments below, and a permanent magnet is brought into range of the pick-up. The ferroresonant pick-up is so changed in inductance, by being shifted the right degree into saturation by the controlling magnetic field, that it shifts into ferromagnetic resonance. Accompanying this change is a change of three or four times the normal value of current in the device; and this may be manifested by a change in voltage across the device in appropriate circuits. The characteristically large signal which is readily obtainable directly from such a device is of immense value in many applications of static magnetic pick-up devices.

As will be seen below, paired ferroresonant devices, as well as elongated ferromagnetic devices, may be arranged for coincidence detection. Each of the devices may be operated at a large value of inductance identified with its non-saturated condition; and ferroresonant operation occurs when both of the devices or both ends of an elongated device are simultaneously driven into saturation by properly polarized magnets or magnetic recordings. So long as either one of a pair of pick-ups in a coincidence detector is in its unsaturated condition, it is too heavily inductive for ferromagnetic resonance; however, when both of a pair of ferromagnetic pick-up heads are shifted properly into saturation by the control magnetic fields associated with them, the pick-ups simultaneously shift into ferromagnetic resonance and an indication of coincidence is obtained.

As will be seen from the illustrative disclosure that follows below, various forms of coincidence detectors employing the phenomenon of ferromagnetic resonance are disclosed. Among them is a particularly important form in which the change that occurs between operation under resonant and non-resonant conditions is made far greater than normally obtainable simply from the "jumping" phenomenon. This result is achieved by means of a pair of ferroresonant devices fed from a common excitation source, in an arrangement where either one or the other may be ferroresonant at a time, but not both; and a common output coupling to these devices is so arranged that each device, in shifting into ferroresonance, kicks the other device out of ferroresonance. This phenomenon is arranged to produce an extremely high output that contrasts greatly from the low practical level of output (theoretically nil) obtained otherwise. The output is distinctive in that it contains a large proportion of a component of half the excitation frequency, and is therefore readily separable from the excitation frequency components that might reach the output circuit. The arrangement of connections is such that, during resonant operation and especially during non-resonant operation, the excitation frequency is self-cancelling in the output circuit. When two of the devices are exposed to magnetic fields under conditions when they should indicate coincidence, they "jump" into ferromagnetic resonance in alternation, and the output rises to a very high value. The high value of output, and the prominent subharmonic frequency in that output, do not exist so long as only one of the devices is exposed to a magnetic field.

As will be seen, the coincidence detectors can be made of ample sensitivity, and they are sensitive to magnetic polarity.

The foregoing properties of the coincidence detectors just described of having a very wide change in output between ferroresonant operation and non-resonant operation, and of producing subharmonic output, can be employed advantageously in applications where magnetic field detection and coincidence detection are of no direct concern. Thus, this operation is of advantage in the detection of changes in alternating-current voltages, in changes of frequency into and out of resonance, and in many other applications such as in the detection of sharp temperature rises, bearing in mind the reduction in permeability of certain steels which occurs when the ambient temperature rises.

The nature of the invention, and its various aspects and further features of novelty, will be better appreciated from the following detailed disclosure of various illustrative embodiments which are shown in the accompanying drawings.

In those drawings.

Figure 10:
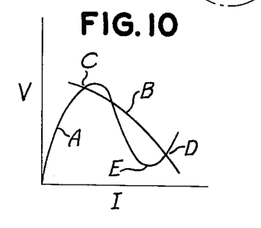
FIG. 10 is a graph theoretically representing the operation of a ferroresonant device in series with a condenser.

Referring first to FIG. 10, two curves A and B appear. This graph represents the theoretical operating characteristics of an iron core coil in series with a condenser, at a frequency at which ferroresonance can occur. The coil has an iron core having a sharp knee in its saturation curve, and the coil also has a certain inherent amount of distributed capacitance. Curve A shows the variation of current with alternating-current voltage across the coil, and curve B is the load line of the circuit.

If the voltage is gradually increased so that alternating current of progressively increased amplitude is impressed on the series circuit, a critical point C is reached at which the two curves, A and B, intersect. At this point, without any further increase in the voltage applied, the voltage across the coil continues to rise. There is an accompanying rise in current which shifts the core into its saturated region; and the inductive reactance suddenly drops. Curve A is seen to have a negative slope, so that with no increase in voltage applied to the series coil and condenser, the current rises until the intersection D of curves A and B is reached. At the lowermost point E of the negative slope of the curve A, the inductive reactance of the coil and the series capacitive reactance are theoretically equal, and when the current increases above this point, the impedance of the coil is somewhat capacitive rather than inductive. Above point D on curve A the series circuit is in a stable region and below point C on curve A the series circuit is in a stable operating condition. However, between points C and D the device is inherently unstable and changes of the operating parameters can cause a shift from one stable region to the other or reversely.

Figure 1:
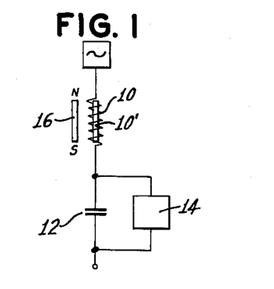
FIGS. 1 to 7, inclusive, and 12 and 13 are diagrammatic representations of various ferromagnetic devices embodying features of the invention.

Referring now to FIG. 1 there is shown a series circuit including an iron-core coil 10, the core 10′ of which is of high permeability ferrous material having a sharp knee in its saturation curve; and a condenser 12 is connected to coil 10, both being connected in series for energization by a source of alternating current as indicated. At the junction of the coil and the condenser, a high-impedance utilization device 14 is connected, either across the condenser or, alternatively, across the coil, as may be preferred. Additionally, a permanent magnet 16 is shown near the core 10′.

It may be assumed that magnet 16 is tentatively absent from the assembly illustrated in FIG. 1, and that the operating frequency is somewhat higher than that at which coil 10 and condenser 12 are series-resonant. The circuit 10, 12 is operating at a point below C on the curve A of FIG. 10.

It may now be assumed that magnet 16 is moved relative to coil 10 into position where the field of the magnet threads along core 10′. This has the same effect as an increase in voltage, in that the core is shifted into its saturated region, and by snap-action, the current abruptly jumps to a much higher value. The reactance of condenser 12 is fixed, and consequently the voltage across the condenser jumps abruptly to a much higher value than before the jump occurred.

Utilization device 14 may be a control relay for a power device. Magnet 16 may be fixed at the floor of a building adjacent to an elevator shaft and coil 16 may be mounted on the elevator so that when the two come into proper alignment, device 14 is energized. This is only one illustration of a proximity switch in which the components are essentially magnetic. The relatively movable parts 10 and 16 cannot wear or degenerate, as they could if they were mechanical or if they used electrical contacts. There are of course innumerable other applications of such magnetic proximity switches in which a magnet 16 may be arranged to move critically in relation to core 10′ to produce snap-action in the ferromagnetic device 10. In another application, member 16 may be mounted fixedly in relation to coil 10, and (as in FIG. 4) a magnetizing and demagnetizing coil may be wound about it so as to constitute a memory or bit-storage device of members 10 and 16. The various parameters of the circuits are such that if magnet 16 is demagnetized in the latter application, or if it is removed in the previous application, the circuit 10, 12 lapses into the low-current portion of the characteristic, below point C in FIG. 10. Magnet 16 is a control magnet and is a means for impressing a magnetic field on core 10′ of the iron core coil 10 for producing snap-action.

Figure 2:
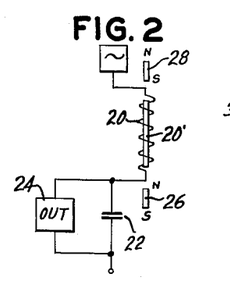

In FIG. 1, the iron core coil 10 represents a sensing head for a magnetic field producing member 16. In FIG. 2, an iron core coil 20 has an elongated slender core 20′, coil 20 being connected in series with condenser 22 and being energized by a source of alternating current potential of a frequency above that for which members 20 and 22 are series-resonant. A utilization device 24 is connected to the junction of the coil and condenser, and may consist of a relay for controlling any suitable apparatus, as in the case of FIG. 1. Adjacent the ends of core 20' are a pair of permanent magnets 26 and 28, both polarized to induce magnetization in core 20' in the same direction. Magnets 26 and 28 are each chosen of an inadequate strength or, more precisely, magnetic moment, to shift coil 20 into ferroresonance, thus being different from magnet 16 in relation to coil 10 of FIG. 1. However, with both of the magnets 26 and 28 polarized alike, so as not to be mutually opposing or even cancelling in core 20', the two magnets 26 and 28 are effective to shift coil 20 with its series condenser 22 into series resonance. If either magnet 26 or 28 is missing, or if either one is reversed, then there will be no jumping of the current and no ferroresonance in effect. Because it takes two properly related magnets to produce ferroresonance, it is evident that the device of FIG. 2 is well suited as a coincidence detector. Both magnets 26 and 28 may be movable in relation to iron-core coil 20. In the alternative, either one these magnets may be of relatively hard iron and may have a coil (as in FIG. 6 to be described) for appropriately storing a memory bit of information for comparison with the magnet to be presented at the opposite end of the coil. Suitable means is contemplated for supporting and moving each or both of the magnets 26 and 28 in relation to the coil and core 20, 20', where appropriate. With both magnets in position and properly polarized in relation to each other, the device of FIG. 2 shifts into the high current state of operation in which case a high voltage is developed across the condenser 22 for operating the utilization device 24. Removal or reversal of either one of the magnets, or demagnetization of either one of them, will reverse the effect and shift the device back into the low current portion of its operating characteristic, below point C on curve A of FIG. 10.

Magnet 26 may be regarded as a means for providing bias for core 20', so that the core will be close to the knee of its operating characteristic. Under those circumstances, and particularly where core 20' is considerably shorter than is desirable for a coincidence detector, the device becomes more sensitive and more responsive to a single properly polarized magnet 28 adjacent to the core.

It is unnecessary, of course, for the magnets 26 and 28 to be physically aligned with core 20', but they may be disposed in any way appropriate to the foregoing operational results. Thus, either or both of the magnets may be disposed adjacent its respective end of core 20', extending parallel to the core as in the case of FIG. 1.

Figure 3:
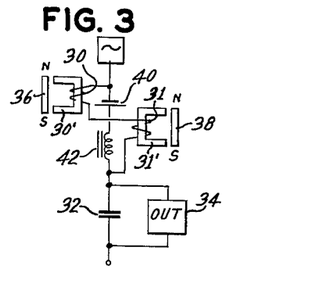

A further modification, resembling FIG. 2, is shown in FIG. 3, in which the coil 20 is replaced by a pair of coils 30 and 31, having respective U-shaped cores 30' and 31'. These two iron-core coils 30 and 31 are connected in series with each other and with condenser 32 so as to be series resonant therewith but only when the inductance of coils 30 and 31 is reduced, as will be explained. A load device 34 is connected in parallel with condenser 32, in a way to produce a reasonably small loading of the resonant effect. A permanent magnet 36 is shown opposite the ends of core 30' and a corresponding magnet 38 is opposite core 31'. As in the case of magnets 16, 26 and 28, magnets 36 and 38 may be supported movably in relation to their respective coils, and one or both of them may be fixed in relation to its core and provided with a magnetizing winding. When both of the magnets are disposed opposite the respective cores in such manner as to reduce the inductance of both coils simultaneously, then the cobined coils and condenser 32 shift into resonance and with the abrupt rise in current according to FIG. 10, a high voltage suddenly develops across condenser 32 which is impressed on the utilization device 34. In the embodiment of FIG. 3 there is no need for any concern over the mutual cancelling effect of the magnetic fields of the two magnets 36 and 38. However, in order to increase the sensitivity of the device and to give it a sense of discrimination for the proper polarity of the magnets 36 and 38, a bias source 40 with means 42 for preventing by-pass of the alternating current impressed, are provided. The bias of direct current source 40 is to be of such low magnitude as to keep the device in the low-current level of operation, below point C in FIG. 10. It may be noted that not only does the bias source have the advantage of increasing the sensitivity of the system to the field of the various magnets illustrated, but the bias has the related advantage of holding to a minimum the required amplitude of drive in the alternating current supply, and thus also minimizing the demagnetizing influence of the coils on the magnets.

When the bias supply is included and in operation, the system is polarity-sensitive, and either removal of either magnet 36 or 38 or reversal of either magnet will shift the entire device out of the high current operating portion of its characteristic and into the low current condition. This device is eminently well suited for use as a coincidence detector, and is of special advantage where it may be necessary to physically separate the two devices which are to be compared.

Figure 4:
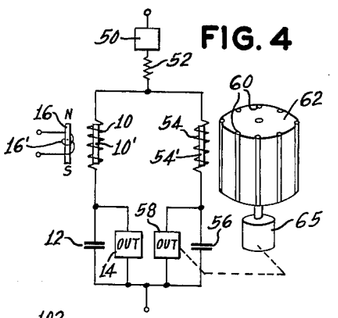

FIG. 4 is a further modification of the invention, incorporating coil 10, core 10', condenser 12 and utliization device 14 of FIG. 1, together with magnet 16. In this instance, however, magnet 16 has a coil 16' wound about it, and is equipped with conventional supply means (not shown) for magnetizing the magnet 16 and for demagnetizing it, as may be required. A source of alternating current 50 is connected to the series coil 10 and condenser 12, with series resistance 52 interposed. This resistance may be the internal resistance of the source 50; it is shown separately only for emphasis.

In addition to the coil 10 and condenser 12, which are series-resonant at the frequency of supply 50 when magnet 16 is in the position illustrated, there is another series-resonant circuit consisting of coil 54 having core 54' in series with condenser 56 having an output utilization device 58 connected across condenser 56. Series-resonant circuit 54–56 is not resonant in the absence of a magnet corresponding to magnet 16, but is inductive at the frequency of supply 50. When a magnet 60 of appropriate strength is brought suitably close to core 54', the iron-core coil 54 is shifted into ferroresonance, and this device suddenly draws an increased amount of current, and an increased voltage drop is produced in resistance 52. Series-resonant circuit 10, 12 is thereby robbed of its operating voltage. This series-resonant circuit, although it has magnet 16 close to it, is consequently shifted into the low-current portion of its operating characteristic. When magnet 60 is removed, the lefthand side 10–12 of the circuit again reverts to its condition of series-resonance.

Magnet 60 is shown supported on a drum 62, and there is a series of elements 60 (some magnetized and others demagnetized) distributed about the periphery of that drum. When the drum brings one of the magnetized elements 60 into position opposite core 54', that magnet is effective to cause the circuit to flip from high current in left-hand branch to high current in the right-hand branch.

When there is no magnet opposite either core 10' or 54' there is low current in both of the branch paths, and therefore low voltage across both output devices 14 and 58. When either one of the cores is exposed to a magnet, then that branch circuit draws high current. When magnets are brought to both cores, high current flows in only the path to which a magnet was brought last.

If magnet 16 is in position, and the particular element 60 opposite core 54' is not magnetized, then coil 10 will be in its high-current condition. Drum 62 may be indexed one or more steps by drive unit 65 under control of output circuit device 58 to bring successive elements 60 into position, until the properly magnetized one causes a shift of the high current condition to the right-hand branch 54, 56 of the circuit and produces high voltage across control unit 58. Unit 58 may be arranged to control the advance of drum 62. The advance of drum 62, and of a mechanical work device ganged thereto, is thus controlled directly by the advance of a magnet 60 to core 54′ when a magnet is disposed adjacent core 10′. Further advance of the drum by a pre-set series of steps to bring the next magnet 60 opposite core 54′ is achieved by momentary reversal of the polarity of the magnet 16 by reversing the current through coil 16′, or by interrupting and restarting the magnetizing current in coil 16′ where its core is of soft iron.

Figure 5:
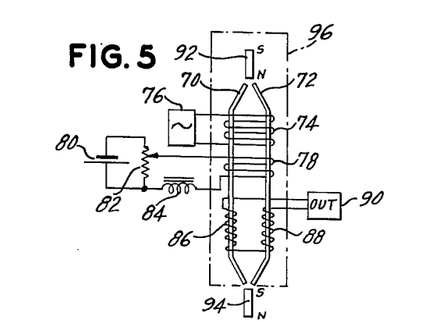
Figure 6:
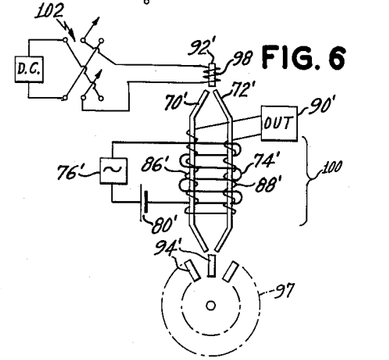
Figure 7:
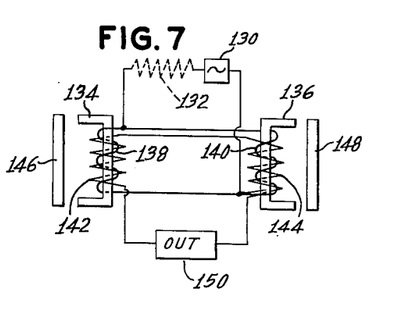

While the circuit of FIG. 4 has practical merit, it also serves the special purpose of aiding in the explanation of further embodiments shown in FIGS. 5, 6 and 7. In FIG. 5, there appear a pair of relatively long and slender cores 70 and 72 whose end portions are disposed close to each other. A primary winding 74 is connected to an alternating-current source 76 of constant frequency and amplitude. Winding 74 is wound in like sense on the cores, so as to produce like polarities, instantaneously, at the ends of cores 70 and 72. Similarly, a bias winding 78 having a direct current source 80, a potentiometer 82 and an A.C. isolating choke 84 are arranged to provide sustained electromagnetic bias in cores 70 and 72, likewise producing like polarities at the ends of the cores. A pair of output windings 86 and 88 are disposed on core elements 70 and 72, respectively, coils 86 and 88 being connected in series. In this arrangement one of these coils may be considered as carrying current instantaneously in the same direction as coil 74 (inducing like polarity of magnetization in the common core) while the other of these two coils 86 and 88 may be considered as carrying current instantaneously in the opposite direction as coil 74. Phrased otherwise, the sense relationship of the windings 74 and 86 is opposite to the sense relationship of the windings 74 and 88. A utilization device 90 is connected to the output end of the series-connected windings 86 and 88. Device 90 preferably has high impedance, and may have the grid circuit of a vacuum tube amplifier at its input, so as not to load the ferroresonant output unduly. A magnet 92 is disposed opposite the upper end of cores 70 and 72 and a further magnet 94 is disposed opposite the lower end of cores 70 and 72. The upper magnet 92 has its north pole opposite to the ends of core elements 70 and 72 and the lower magnet 94 has its south pole opposite the ends of core elements 70 and 72, these two magnets being such as to have fields threading in the same direction along core elements 70 and 72. Each of these control magnets inherently develops a field that is imposed predominantly on the respective adjacent portions of core elements 70 and 72, and because of the described polarities of the control magnets, where the fields of magnets 92 and 94 overlap, there is no cancellation but rather an augmenting of the two field strengths.

A magnetic shield 96 encloses magnet 92 and core elements 70 and 72 together with the windings thereon, shield 96 being open at the end thereof which is opposite to the external magnet 94 that is being sensed. It is of course contemplated that magnet 92 may be separably supported so that both magnets are being sensed, in a comparison or coincidence detection device, in which case the shield would be appropriately modified.

The windings 74, 78, 86 and 88 are diagrammatically illustrated, for it is to be understood that all of these windings are closely coupled to each other and extend in overlapping relation along the entire length of cores 70 and 72 except for the bent end portions of those cores illustrated. Magnet 92 and 94 are quite short, in relation to the elongated cores 70 and 72, as illustrated, and the air gap between the cores and the respective magnets is short relative to the length of the magnets.

Figure 11:
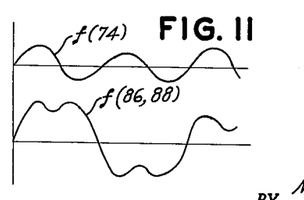
FIG. 11 is a graph showing input and output waveforms typical of the device in FIGS. 5–7.

The frequency of source 76 is deliberately made higher than that at which ferroresonance can occur, and the amplitude is held lower than a value that might produce ferroresonance, with either magnet 92 or 94 removed. The bias of direct current supply 80–82–84 is adjusted so as to bias cores 70 and 72 only part way toward the knee of their saturation curve, and in the same polarity as that which is induced by magnets 92 and 94, so that the direct current bias field and the fields of magnets 92 and 94 are all additive in cores 70 and 72. When both cores 92 and 94 are close to the ends of cores 70 and 72 and with the polarity indicated, a sustained output appears at unit 90, typically of the waveform indicated in FIG. 11. The excitation frequency $f(74)$ is shown in the upper portion of the figure, and the output of coils 86–88 is seen to be half the excitation frequency of supply 76 superimposed on the supply frequency. When either or both of the magnets 92 or 94 is removed from cores 70, 72, the output of coils 86 and 88 dwindles to virtually zero. The structure involved operates in this manner, without requiring additional controls, by reason of the relative proportions of the described apparatus itself. These proportions include such parameters as the frequency and the amplitude of the excitation provided by source 76, the distribution of the windings on the cores, the relationship and relative proportions of the control magnets and the saturable cores, as mentioned above. The output is literally zero in the case of perfectly balanced symmetrical units, since the voltage induced by coil 74 is self-cancelling in coils 86 and 88 by virtue of their relative senses.

The theory of operation of this device is related to the bistable flip-flop in FIG. 4 previously described. In that device of FIG. 4, it will be recalled that the high current condition of ferroresonance could appear only in one of the two branch paths, the other having too low a voltage applied to it to drop into resonance. The possibility of reversing the high-conductive path from one branch to the other always exists, but to effect reversal requires deliberate action. In the device of FIG. 5, coil 86 may be considered to be a series-resonant branch which is connected to another series-resonant branch 88, these two being energized by coil 74 and source 76. Like resistor 52 in the circuit of FIG. 4, the source impedance is common to both of these branch circuits 86, 88. When the magnets are in effect, one of the coils 86, 88 but not both of them is in ferroresonance all the time, and each one is coupled to the other conductively, inductively and by way of the excitation winding 74. As a result, there is a rapid reversal of the high-current condition, back and forth. The action of each coil 86 and 88 going into resonance apparently produces that excitation which is necessary to drive the other winding 86 or 88 into its high-current condition and thereby driving the initiating coil 86 or 88 into its low current condition.

Whatever the exact explanation may be, there is an abrupt jump that occurs when the two magnets are brought into effect. An output voltage of virtually zero at utilization device 90, in the absence of magnet 94, may rise to a voltage of 160 volts in an example. The device of FIG. 5 thus contrasts sharply in at least one respect from that of FIGS. 1 to 4, inclusive, namely, the change in output voltage or current which takes place when the conditions change so as to produce ferroresonance. This change may involve a shift of 4 to 1 in FIGS. 1 to 4, whereas in FIG. 5 the change is much higher in practice. Theoretically an infinite change is involved since no output exists in a non-resonant carefully balanced device according to FIG. 5. Moreover, the output frequency of the unit in FIG. 5 has a strong half-frequency component compared to the input excitation. On the basis of the distinctive output frequency component that does not exist in the absence of ferroresonance, the change occurring when the device goes into ferroresonance signifies a distinctive type of operation. The device shown in FIG. 5 evidently does not include any discrete capacitors, but it goes into ferroresonance when its inductive effects resonate with the inherent distributed capacitances of the windings described.

The extreme change from virtually null before ferroresonance to a quantity that is as large as may be desired has many applications in which the distinctive operation is of obvious importance. As will be seen, it has particular value where coincidence is to be detected between two magnets 92 and 94. Additionally, the detection of multiple coincidences simultaneously may be effected by a large number of heads having the output of all of the heads combined, as by series connection to present two output terminals. Coincidence at any one of the multiple heads used is represented by a large output voltage, prominently containing a component of half excitation-frequency, while complete failure of coincidence detection in all of the heads is represented by zero output or virtually zero output from all of the output windings combined.

The device of FIG. 5 is an excellent magnetic pick-up head, useful for the same purposes as the devices in FIGS. 1 to 4. Thus, if magnet 92 be regarded as a bias device and coil 78 similarly a bias device, the pick-up head within shield 96 may be used as a magnetic proximity switch, applicable as a limit stop, a depth gage or the like. Furthermore, as is clear from FIGS. 2 and 3, the device of FIG. 5 may be used as a coincidence detector so that if either or both of the magnets 92 and 94 are removed or demagnetized or of the wrong polarity, then no output will appear. If bias winding 7 is omitted, then coincidence will mean like polarities of the magnets while, with bias, only like polarities where both are of a predetermined polarity will produce ferroresonance, thereby indicating coincidence.

The wide change from zero to a large half-frequency value of output, as compared to the input, has special value and may be variously employed even in the absence of magnets 92 and 94. For example, cores 70 and 72 with coils 74, 86 and 88 may be by design near or at ferroresonance in relation to supply 76, this being used with or without D.C. bias, for the detection of frequency drift of the supply from a point either above or below ferroresonance into or out of ferroresonance. The device may be used to detect a rise in amplitude of the excitation frequency source 76, by virtue of greater saturation prevailing in the cores at higher values of supply voltage. Additionally, the device may be used to detect a rise in direct current through coil 78 tending to drive the device into ferroresonance. In each of those applications, since the change is not from a low value to a higher value of output than is usually characteristic of ferroresonant devices but is instead the result of a change from virtually zero output to a very large output, high sensitivity in response compared to the controlling condition is realized, and a kind of "on-off" operation may be attained.

The device of FIG. 5 is illustrated in modified form in FIG. 6 where primed numerals are used to indicate corresponding parts. In FIG. 6 cores 70' and 72' have the output windings 86' and 88' respectively connected in series and in opposite senses in respect to the juxtaposed ends of the elongated cores 70' and 72', just as in the case of FIG. 5. An excitation winding 74' extends about both cores and is, therefore, in like sense about those two cores. Winding 74' is also used in FIG. 6 to carry any bias current required, supplied by a suitably isolated direct current source 80'. Magnets 92' and 94' are disposed opposite the ends of core elements 70' and 72'. The amplitude of the alternating current source 76' and its frequency are adjusted in relation to the device so that ferroresonance can occur only when both magnets 92' and 94' are magnetized and of the proper relative polarity as indicated in FIG. 5. Each magnet alone is made inadequate in length and strength relative to the elongated cores to produce ferroresonance, but both act together for this effect.

In FIG. 6 a series of magnets 94' are carried by a drum 97 so that a succession of comparisons may be effected. Moreover, it is feasible to employ different polarities for each magnet on drum 97, but additionally the polarity of magnet 92' may be changed, depending on the application, by means of a magnetizing coil 98 on magnet 92'. Head 100 thus compares the fields of magnets 92' and 94'. Switch 102 for reversibly connecting a direct current source to coil 98 symbolically represents a control information source. In practice there is contemplated a plurality of pick-up heads 100, plural rings of magnets 94' and a corresponding plurality of magnets 92', in applications involving a combinational code.

Figure 8:
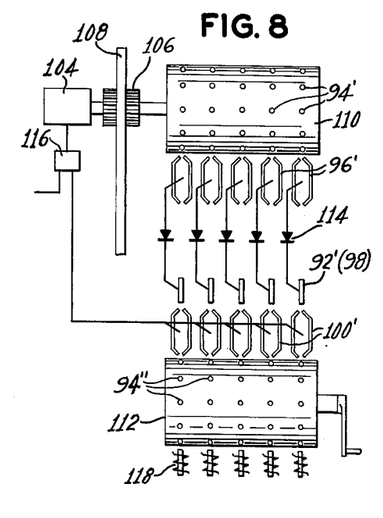
FIGS. 8, 9 and 14 are diagrammatic representations of applications of such devices embodying further features of the invention.
Figure 9:
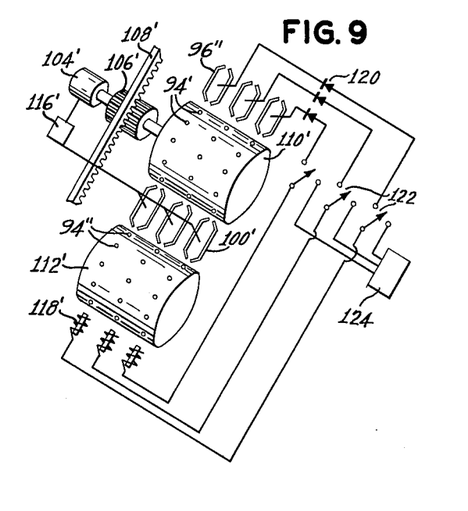

Applications of this device and of that in FIG. 5 are diagrammatically shown in FIGS. 8 and 9. In FIG. 8 a motor 104 is shown for operating a gear 106 and thereby driving a rack-toothed mechanical work member 108 up and down. The motor may be suitably arranged for automatic reversal at opposite ends of its stroke. Appropriate reduction gearing is omitted from this diagrammatic illustration. On the same shaft with gear 106 is a drum 110 bearing a number of axially aligned groups of control magnets 94', each corresponding to magnet 94 in FIG. 5. A series of such axially aligned groups of magnets 94' are disposed about the periphery of drum 110.

A row of pick-up heads 96' corresponding to the pick-up heads enclosed in shield 96 in FIG. 5 are disposed for cooperation with one axially aligned group of magnets 94'. Certain of these are magnetized and certain others are not magnetized, depending on the code item represented, so that only those pick-up heads 96' opposite magnetized elements 94' will produce high output whereas virtually zero output will be obtained from the other heads 96' of the group. Each axially aligned group of magnets 94' is a unique combination of magnetized and unmagnetized or magnetized and reversely magnetized elements. Each group identifies a particular position of the mechanical output or work member 108 whose position is to be controlled, as will be seen.

A second drum 112 is provided also having a series of control-magnetic elements which are here designated 94" to distinguish them from magnet 94' on drum 110. These magnets 94" are disposed opposite a series of coincidence-detector heads 100' (corresponding to head 100 in FIG. 6) which have a respective electromagnet 92' associated therewith, as in FIG. 6. Heads 100' are arranged to provide comparison of magnets 94" with members 92'. Each magnet 92' has a magnetizing winding as in FIG. 6, the cores of these magnets 92' being of soft iron so as not to be retentive in this instance. The output from each pick-up head 96' associated with drum 110 is rectified by diagrammatically represented rectifiers 114. The outputs of units 100' are combined and fed to control 116 of motor 104. Rectifiers 114 may include input or output current amplifiers, as may be required by the coils, magnets, etc., in the system.

In operation, a particular group of magnets 94" is disposed opposite pick-up heads 100' and motor 104 is operated for bringing one group of magnets 94' after another opposite pick-up head 96. The drum 110 advances step by step or continuously at a reasonable speed, until coincidence is detected between the group of magnets 94' opposite pick-up heads 96' and the selected group of control magnets 94" opposite pick-up heads 100'. At this time, motor control 116 is operated to stop the motor. Thereafter a suitable drive mechanism indexes drum 112 to position another group of magnets 94" opposite comparison head 100'. Drum 110 thereupon automatically resumes its rotation to achieve a position corresponding to the new group of magnets 94". One of the circle of magnets 94" advantageously is arranged to operate a direction control in unit 116 so that motor 104 rotates in a preassigned direction in advancing the next group of magnets 94' to heads 96'. If magnet 94" of this control is magnetized, one direction of motor drive may result, and the opposite motor rotation may be produced by an unmagnetized or oppositely polarized magnet 94".

A series of read-in coils 118 may be provided opposite drum 112, for establishing the sequence or program of positions to which drum 110 is to be driven by motor 104 and thereby to position mechanical read-out or work member 108. This member 108 may, as is obvious, be either an article positioning head, or a machine tool element, or a type bar or any other mechanically operated device, where position is to be adjusted selectively. Electromagnet 118 may be energized in any combination to dictate this mechanical positioning of member 108, as under control of a combinational keyboard, punch card or the like.

It is notable that drum 110 and drum 112 may be physically separated from each other so that each can be mounted in any convenient location. However, the arrangement involves a degree of complexity which one might wish to eliminate. A further modification is represented in FIG. 9 where pick-up heads 96' are eliminated and where drums 110' and 112' are positioned physically close to each other so that a series of coincidence detecting heads 100' can be used to compare the axial groups of magnets 94' on drum 110' with the groups 94" on drum 112'. Drum 112' is a program storage drum with a series of combinational-coded magnets 94" corresponding to the positions to which motor 104 is to drive mechanical read-out or work member 108'. A series of unique position-representing combinations of magnetized and reversely magnetized magnets 94' are carried by drum 110'. A directional control series of control magnets 94" may also be provided on drum 112' as in FIG. 8, the associated head 100' being opposite a uniform ring of magnetized elements 94' on drum 110.

In operation, drum 112' is positioned with one axially aligned group of magnets 94" opposite on one end of each of the comparison heads 100', and motor 104' operates gear 106', mechanical read-out or work member 108', and drum 110' to the successive positions for presenting successive groups of position-coded magnets 94' opposite the ends of comparison head 100' remote from drum 112'. When coincidence or complete failure of coincidence is detected as represented by either full or zero output from every one of the pick-up heads 100' (depending on the convention adopted to signify the desired control), the control for motor 104' will arrest that motor. Motor control 116' includes the appropriate "and" or "or" circuit for this control.

Each new position to which mechanical read-out member 108' is to be located is controlled in succession by the successive groups of control elements 94" on program or memory drum 112'.

A series of read-in and demagnetizing coils 118' are provided in alignment with a row of elements 94" for recording the positional codes desired. These, in turn, are controlled by a group of pick-up heads 96" constructed as in FIG. 5, disposed opposite the comparison head 100'. A series of rectifiers 120 (which may include current amplifiers) and a series of switches 122 are provided between each pick-up head 96" and read-in heads 118' and these switches 122 are arranged for selectively connecting coils 118' either to pick-up heads 96" or to a source of demagnetizing potential 124, or to an inactive point.

When a new set of positional codes are to be recorded on memory drum 112', the mechanical read-out or work element 108' is positioned as may be desired, and switch 122 is first arranged to connect demagnetizing source 124 to the coils 118'. Throwing switches 122 in the opposite direction connects the output of pick-up heads 96" to magnetizing head 118'. Switches 122 are then returned to their mid-positions. Program drum 112 is indexed to the next position and member 108' is shifted to the next position which it is later to assume in automatic operation. A new code corresponding to this new position of member 108' is recorded on the new set of magnets 94" positioned opposite recording magnets 118'. This operation may be repeated successively as many times as there are groups of magnets 94" on drum 112'. During this read-in operation, the motor 104' is not to be controlled by control 116' but is to be manually controlled for locating member 108' in the positions deliberately chosen. A suitable direction-control recording magnet 118' may be provided, controlled in accordance with the manual direction control of motor 104'.

The zero-output of the devices in FIGS. 5 and 6 contrasts with the very large output of those devices under the different magnetically controlled conditions, either in application as a pick-up or in application as a coincidence detector, and these devices have been shown to have applications in performing mechanical read-out functions, as an important application of the invention. FIG. 7 illustrates a still further form of pick-up head having certain operational qualities in common with the devices of FIGS. 5 and 6. However, the two-part coincidence detection device of FIG. 7 may be employed in place of the pick-up heads 100' in the system of FIG. 9, and when this is done there is no longer any necessity of physically positioning drum 110' next to drum 112'. This is because the two portions of the coincidence detector of FIG. 7 are not required to be physically close to each other but may be conveniently separated.

Referring now to FIG. 7 a pair of coils 138 and 140 are connected in parallel to a constant-amplitude source of alternating current 130, having an internal impedance diagrammatically illustrated as resistor 132 shown in dotted lines. Coils 138 and 140 are on U-shaped cores 134 and 136, in one example being 63–DU–HYMU–6, .006 inch thick by ⅝-inch long legs with a cross bar of ¼-inch length, and with a width of material of about 0.10 inch. Additionally, a pair of coils 142 and 144 are wound on cores 134 and 136, respectively, coils 138 and 142 having one relative sense and coils 140 and 144 having the opposite relative sense. The excitation winding of 200 turns of #41 AWG copper wire had a natural resonance frequency of 70 kc. and the combined output winding of 400 turns had a resonance frequency of 180 kc., in the above example. A pair of control magnets 146 and 148, corresponding to magnet 94' and magnet 94" in FIG. 9, are disposed opposite core elements 134 and 136. It is contemplated that magnets 146 and 148 may be carried on any appropriate support such as drums, belts, etc.

When magnets 146 and 148 are missing or are demagnetized, the amplitude and frequency of source 130 is arranged so as to cause the cores 134 and 136 to operate in the portion of curve A below point C in FIG. 10. An operating frequency of 380 kc. was used in the above example. However, when both magnets 146 and 148 are disposed opposite cores 134 and 136, and ferroresonance develops, the operation represented in FIG. 11 occurs, namely, while virtually zero output is developed in coils 142 and 144 when no magnetized elements are present, the output in utilization device 150 suddenly rises to a very large value and containing a large component of half the frequency of source 130 when magnets are presented in proper sense to cores 134 and 148. This, as described in connection with the device of FIG. 5, appears to be what would otherwise be a two-branch bi-stable arrangement of ferroresonant devices. Its own triggering arrangement apparently provides for free-running back-and-forth triggering operation with a large half-frequency output. In the above example, with 24 volts (peak-to-peak) of alternating current excitation and almost no output in the absence of magnets, the output rose to 60 volts with the control magnets in place.

The cores 134 and 136, together with the windings thereon, can be positioned remote from each other and can thus be used with a pair of widely separated drums such as drums 110' and 112' of FIG. 9, but otherwise obtaining full advantage of the system illustrated in FIG. 9. The coincidence detection which occurs in the operation of FIG. 7 is polarity sensitive even in the absence of any directional bias in the cores 134 and 136. With one polarity of magnet 146 opposite core 134, it is necessary to have a certain polarity and only that polarity of magnet 148 opposite core 136 for this free-running ferroresonance effect to occur.

It has been indicated at several points in the foregoing specification that the permanent magnets and the electromagnets that effect control are to be external of the pick-up head and are advantageously movable in relation to the ferroresonant unit. As an alternative it is feasible in some applications to provide an air gap in the magnetic structure of the ferroresonant device, which air gap is completed by an external movable control member of unmagnetized ferromagnetic material external to the sensing head. Thus, in FIG. 12 where "a" series parts are employed corresponding to those in FIG. 5, the sensed device 94b may consist of a continuous band of non-ferrous material 94c with an isolated body 94d of ferrous material that enters an air gap between fixed, internal magnet 94a and a pair of core elements such as elements 70 and 72, rather than to employ an external control magnet at this point. A change in magnetic flux threading through the pick-up head results when the body of ferromagnetic material is interposed in such an air gap, and this may be made effective to shift the pick-up device into ferroresonance, from its normal condition of non-resonance.

Figure 12:
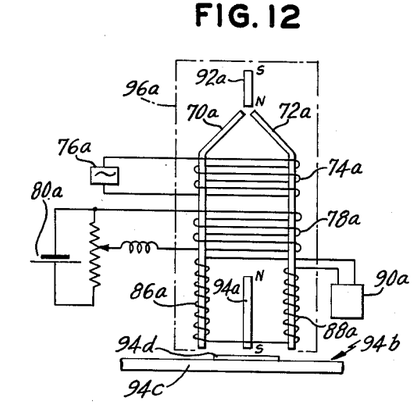

Member 94d may be a body of ferrous material to be detected when it is disposed near the pick-up head, even though that body was not previously magnetized. The body 94d of ferrous material reacts with the directional magnetic field threading through the core elements of the picp-up device, and wth appropriate adjustment this may be made effective to produce ferroresonance.

Figure 13:
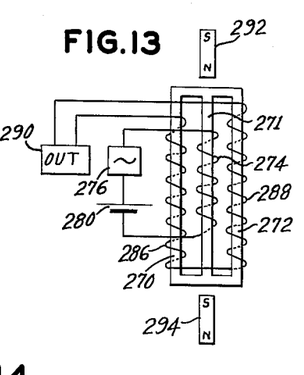

In FIG. 13 a further novel form of the sensing head representing one aspect of the invention is shown, in which 200-series numbers are used, corresponding to like parts found in FIGS. 5 and 6. Two core elements 270 and 272 are provided with windings 286 and 288, wound in opposite sense relative to excitation and bias winding 274 on core element 271. Core elements 270, 271 and 272 may be unitary or an assembly. Bias supply 280 imposes a static magnetic field on core elements 270 and 272, in the aiding sense relative to reference magnet 292 and control magnet 294.

Similar operation results with the device of FIG. 13 as that described for FIGS. 5 and 6. However, the alternating current excitation in FIG. 13 finds a closed ferrous loop (actually two loops) in FIG. 13 so that the tendency of the A.-C. field to demagnetize the control magnet is a minimum and that construction may be preferred if demagnetization is of concern. The ferroresonant devices in FIGS. 1–9, 12 and 14 have what may be termed "open" or "open-ended" cores, to differentiate them from the closed-loop core of the device in FIG. 13.

Figure 14:
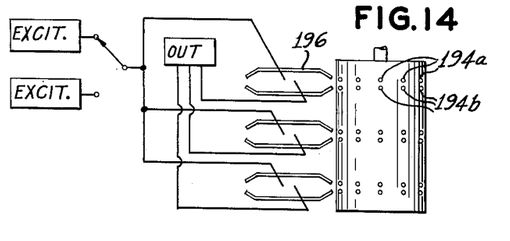

The frequency at which a given sensing head becomes ferroresonant is dependent upon the physical construction of the device and it is also dependent upon the amplitude of the imposed A.C. excitation and on the magnetic bias and the control field. If a number of identical heads are constructed and a level of different bias is imposed upon each one, it will be found that each head will be ferroresonant at a different frequency. Also, if the heads are constructed differently but biased at the same level, it will be found that those heads are each ferroresonant at a different frequency. Either one of these two approaches may be used as a form of scanning, to differentiate the response of a sensing head to different control-magnet sequences. In FIG. 14 two like pick-up heads 196, like that of FIG. 5, for example, may be polarized by bias or excitation voltage or frequency or combinations of these to respond to certain control elements only, and to respond to others upon change of energization. Bits 194a may all be polarized one way, or demagnetized, for example, while bits 194b, also opposed to head 196, may be unmagnetized or reversely polarized. If two excitation sources are provided, as to direct-current bias supplies (or one with a reversing switch) the several heads 196 can simultaneously be changed over from sensing bits 194a to 194b, or the reverse.

Each device as described above (FIGS. 1–9 and 12–14) is normally not in resonance and is shifted into resonance when the magnetic control element is in control relation to the ferroresonant head. That mode of operation is presently preferred, but it is within present contemplation that the head may be normally in the ferroresonance condition when the magnetic control element is out of control position.

The construction and basic operating data of a device have been given in connection with one embodiment (FIG. 7) of coincidence detector. However, very different dimensions and frequencies may readily be used, as to each of the embodiments shown. Consequently, it would serve little purpose to burden this description with further design detail. Those skilled in the art will readily be able to practice the invention from the description given, with a wide latitude of sizes, coils, frequencies and magnetic control elements.

The invention in its various aspects will be found readily amenable to a wide variety of modifications, rearrangements and applications. Consequently, the invention should be broadly construed in accordance with its full spirit and scope.

What is claimed is:

1. Electrical apparatus comprising a circuit including a ferroresonant device having a saturable elongated core, a coil thereon, alternating current energizing means for said circuit, utilization means responsive to the different conditions of said device, whether resonant or non-resonant, and control magnetic means having two mutually independent parts sensed by said device and effective with said parts thereof adjacent respectively different end portions of said elongated core to produce in said device one of said conditions, said apparatus being proportioned so that said device is in the other of said conditions whenever one part of said magnetic means is absent.

2. Electrical apparatus comprising a circuit including a ferroresonant device having an elongated saturable core, a coil thereon, alternating current energizing means for said circuit, directional magnetic biasing means for said core, utilization means responsive to different conditions of said device, whether resonant or non-resonant, and polarized magnetic means including a pair of magnets adjacent the ends of said core, respectively, said polarized magnetic means being sensed by said device and being effective to produce one of said conditions in said device only when said magnets both add to the field of said biasing means, said apparatus being proportioned so that said device is in the other of said conditions whenever said magnetic means is absent or oppositely polarized.

3. Electrical apparatus in accordance with claim 2 wherein at least one of said magnets is movably supported in relation to said device and wherein an additional series of magnets is assembled to said one magnet to constitute a selective assembly of magnets.

4. Electrical apparatus in accordance with claim 2 wherein both said magnets are parts of respective control magnet assemblies both movable relative to said device.

5. Electrical apparatus comprising a circuit including a ferroresonant device having an elongated saturable core, a coil thereon, alternating current energizing means for said circuit, utilization means responsive to the different conditions of said device, whether resonant or nonresonant, and magnetic pattern devices adjacent the respective ends of said elongated core and movable in relation thereto in a manner to present successively different pattern portions to said ferroresonant device, said pattern devices being sensed by said ferroresonant device and effective to produce therein one of said conditions, said apparatus being proportioned so that said device is in the other of said conditions in the absence of match of the portions of said pattern devices adjacent the ends of said core.

6. A control system, including a position representing member bearing magnetic elements arranged in groups and tracks, each of said groups of magnetic elements being uniquely different from the others, a series of coincidence detecting magnetic sensing heads disposed to sense the respective magnetic elements in any one of said groups, means to advance the position representing member in relation to said coincidence detecting magnetic sensing heads to present the successive elements in said tracks to the magnetic sensing heads, control means operable to present position-coded magnetic fields to the respective coincidence-detecting magnetic heads, and utilization means connected to and responsive to said coincidence detecting magnetic sensing heads.

7. A control system, including a position representing member bearing magnetic elements arranged in tracks and groups, each of said groups of magnetic elements being uniquely different from the others as position codes, a series of coincidence detecting magnetic sensing heads disposed to sense the respective magnetic elements in any one of said groups, a movable work element, means for advancing said work element and said position representing member coordinately so that said tracks of magnetic elements advance relative to said sensing heads so as to present said position-coded groups of magnetic elements to said sensing heads successively, control means operable selectively to impose position-coded control magnetic fields on said magnetic sensing heads for comparison with the position codes of said groups of elements, and means responsive to the coincidence detecting heads for controlling said work-element advancing means.

8. A control system, including a first member bearing magnetic elements arranged in groups and tracks, each of said groups of magnetic elements being uniquely different from the others, a series of coincidence detecting magnetic sensing devices each having a first portion disposed to sense a respective element in one of said groups, means to advance said first member in relation to said first portions of said coincidence detecting magnetic sensing devices to present the successive magnetic elements in said tracks thereto, each said device having a second sensing portion, control means operable to present to said second sensing portions, respectively, a control combination of magnetic fields, and utilization means connected to and responsive to said coincidence detecting magnetic sensing heads.

9. A control system including a position representing member bearing magnetic elements arranged in tracks and groups, each of said groups of magnetic elements being uniquely different from the others so as to represent a particular position, control means including respective parts arranged in control groups and in tracks corresponding to the number and spacing of the tracks on said position representing member, a series of coincidence detecting magnetic sensing heads each having a portion in sensing relation to one of the tracks of said position representing member and another portion in sensing relation to the related part of said control means, and utilization means connected to and responsive to said coincidence detecting magnetic sensing heads.

10. A control system including a position representing drum bearing magnetic elements arranged in tracks and groups, each of said groups of magnetic elements being uniquely different from the others so as to uniquely represent a position of the drum, a magnetic memory drum having groups and tracks of magnetic parts adapted to provide position-coded magnetic information corresponding to a series of predetermined positions of the position representing member, a series of coincidence detecting magnetic heads disposed to sense simultaneously the respective ones of a group of said elements and the respective ones of a group of parts on said position representing member and said control means, respectively, a series of magnetic sensing heads disposed to sense said elements of said position representing member, a group at a time, so as to provide position codes corresponding to particular positions of the position representing drum, a series of recording electromagnets disposed in magnetizing relation to a group of magnetic parts of said control drum, and means to connect said electromagnets so as to record on the control drum position codes sensed by said magnetic sensing heads.

11. In combination, a signal utilization device, ferroresonant means including a pair of coils connected in series to said signal utilization device, each coil having a readily saturable open-ended core, magnetic control means having two selectively operable mutually independent parts each arranged relative to said ferroresonant means for selectively impressing a sustained magnetic field preponderantly on respectively different portions of said cores, and a source of alternating current connected to said ferroresonant means and proportioned relative thereto in frequency and amplitude to cause resonance or non-resonance in accordance with the prevailing match or mismatch of said magnetic field impressing means.

12. In combination, an output device, a ferroresonant device including readily saturable core means and a winding thereon, a movable pattern member having a series of control magnets arranged to impress the field of any selected control magnet preponderantly on a first portion of said core means, selectively operable magnetic reference means arranged to impress a reference magnetic field predominantly on another portion of said core means, and a source of alternating current excitation for said ferroresonant device of a frequency and amplitude proportioned relative to said device and the magnetic fields of said magnets and said magnetic reference means to cause said ferroresonant device to be resonant or non-resonant in accordance with the prevailing concurrence or lack of concurrence between the impressed magnetic fields.

13. In combination, a pair of ferroresonant devices each including a coil having a readily saturable core, means including two movable pattern members each having a series of control magnets for at times impressing magnetization on said cores, a common source of alternating current energization for said coils of a frequency to cause said devices to be alternatively ferroresonant and non-resonant in dependence on the magnetization impressed on the ferroresonant devices by said pattern members, said ferroresonant devices constituting coincidence detectors for the respective portions of the pattern members sensed thereby, drive means for one of said pattern members controlled by said coincidence detectors, and a work element operated by said drive means.

14. In combination, a signal utilization device, a pair of ferroresonant devices each including a coil having a readily saturable ferromagnetic core, said coils being connected in series with each other and to said utilization device and being located remote from each other, two-part magnetization means including a movable pattern member having a series of control magnets selectively settable adjacent one of said ferroresonant devices to impress magnetization thereon, said magnetization means also including selective reference magnetizing means arranged adjacent the other of said ferroresonant devices for selectively impressing magnetization thereon, and a common source of alternating current energization for said ferroresonant devices of a frequency and amplitude related thereto to cause said ferroresonant devices to be resonant or non-resonant in accordance with the prevailing comparison of the parts of said two-part magnetizing means.

15. In combination, a ferroresonant device including a pair of open cores of readily saturable ferromagnetic material having side-by-side ends, a coil on each of said cores and an exciting winding about said cores, alternating current exciting means connected to said winding and a signal utilization device connected to both said coils, said coils being connected in series and arranged on the cores so that a current therethrough would produce opposite polarization at said side-by-side core ends and said winding being so related to said cores that a current in the winding would produce like polarization at the side-by-side core ends, control means for impressing sustained directional magnetization in both said cores concurrently in the sense to polarize a pair of adjacent core ends alike and means for selectively applying and removing said control means, the alternating current exciting means being related to said ferroresonant device so as to produce resonance or non-resonance in dependence on whether said magnetization is being impressed.

16. The combination in accordance with claim 15, further including means for maintaining magnetic bias arranged to polarize adjacent core ends alike.

17. The combination, in accordance with claim 15, wherein said cores are elongated, said magnetization impressing means is disposed to act predominantly on one side-by-side pair of ends of said elongated cores, and a second magnetization impressing means is disposed to act predominantly on the other side-by-side ends of said elongated cores, said magnetization impressing means and said second magnetization impressing means both being effective to produce resonance or non-resonance in dependence on whether there is coincidence between the polarities they induce in the cores.

18. Ferroresonant apparatus having a closed-loop core structure including a center leg and two outer legs, an exciting winding on said center leg and output coils connected in series and disposed on said outer legs, the exciting winding having one relationship to the coil on one leg and the opposite relationship to the coil on the other leg, a supply of alternating-current excitation connected to said exciting winding, said supply being of a frequency and amplitude to produce ferroresonance in the aforementioned apparatus, and a control unidirectional magnetizing device in control relation to said apparatus.

19. Ferroresonant apparatus in accordance with claim 18, including polarized magnetic biasing means for said center leg, and means for presenting to the ends of said core legs a pair of magnetic elements to be compared.

20. Apparatus for interpreting the relationship between sequences of information bits in two sources of information, including a first magnetic program unit constituting one of the sources of information and comprising a sequence of ferromagnetic portions having different states of magnetization in accordance with the bits of information which each such portion represents, another unit constituting another source of information and including at least one ferromagnetic element having selectively different states of magnetization in accordance with the bit of information to be represented by such element, a magnetic sensing coincidence detector including two core portions each predominantly exposed to a respective one of said units, and said coincidence detector having windings about both said core portions including excitation-current input connections and coincidence-detection output connections, said detector being arranged to provide a distinctive response when both the core portions are exposed to magnetic fields having a predetermined polarity relationship to said core portions, operating means for said first magnetic program unit for presenting and exposing the information-representing portions thereof individually to one of said core portions, means for operating the second unit to successively change the information presented thereby to the other core portion of said magnetic coincidence detector, and utilization means connected to said output connections of said detector.

21. Apparatus in accordance with claim 20, including alternating-current excitation means connected to said detector and wherein the parameters of said detector, said alternating-current excitation means and said information units are related to produce ferroresonance in response to magnetic fields of said predetermined polarity relationship.

22. In combination, a first member bearing a series of magnetic elements whose respective states of magnetization represents stored information, a combined magnetic sensing and coincidence detecting device having a first saturable magnetic portion with a winding thereon and disposed to sense said first member, means effecting relative movement between said member and said device to effect scanning of said magnetic elements by said device, said device having a second sensing portion including a core of saturable ferromagnetic material and a winding thereon, selectively operable means at said second portion for producing successively different magnetic fields representing bits of information, and utilization means connected to and controlled by said coincidence detector.

23. A method of detecting control magnetic fields of a preselected polarity, including the steps of exciting a device, having an elongated saturable ferromagnetic core and a coil on said core, at a frequency that produces resonance when the core is saturated but at an amplitude in relation to the impedance thereof insufficient to maintain resonance in the absence of a saturating magnetic field, subjecting one portion of the elongated core to a reference magnetic field of a magnitude sufficient to induce saturation therein and subjecting the remainder of the elongated core to a control magnetic field of sufficient intensity to produce saturation in said remainder of the core, thereby to shift the device into ferroresonance only when and only so long as both said magnetic fields act in the same sense in said core, and utilizing the resonant and non-resonant conditions of said device to provide output as a representation of whether or not said control magnetic field is acting on said remainder of said core and in the aiding sense relative to said reference magnetic field.

24. In combination, a ferroresonant device including a pair of readily saturable open cores, a coil on each core, and an exciting winding about both said cores, said coils being connected in series and each coil being distributed along its respective core, each of said cores having opposite ends adjacent corresponding ends of the other core and said coils being wound so that a current through them would produce opposite polarization at the adjacent core ends, said exciting winding being arranged so that a current therethrough would produce like polarization at the adjacent core ends, magnetic control means for said device including an assembly of magnetized ferromagnetic members and means to advance said members individually into and out of proximity to said cores in relation thereto to impress magnetization in both said cores concurrently in the sense to polarize a pair of adjacent core ends alike, alternating current excitation means connected to said exciting winding, the frequency and amplitude of the excitation being related to said ferroresonant device so that said device is rendered resonant by certain of said ferromagnetic members when in proximity to said device, and utilization means connected to said series-connected coils.

25. In combination, a ferroresonant device including a pair of open cores of readily saturable ferromagnetic material remote from each other, a coil on each of said cores and an exciting winding about said cores, alternating current source means connected to said exciting winding and a signal utilization device connected to both said coils, said coils being connected in series and being arranged in one sense relative to said winding on one of said cores and in the opposite sense relative said winding on the other of said cores, control means for impressing directional magnetization in both said cores concurrently, and means for selectively applying and removing said control means, the alternating current source means being related to said ferroresonant device so as to produce resonance or non-resonance therein in dependence on whether or not said magnetization is being impressed on both said cores.

References Cited by the Examiner
UNITED STATES PATENTS

| | | | |
|---|---|---|---|
| 2,380,242 | 7/1945 | Jewell | 323—89 |
| 2,427,213 | 9/1947 | Jewell | 340—174 |
| 2,709,757 | 5/1955 | Triest | 323—89 X |
| 2,723,353 | 11/1955 | Spitzer et al. | 307—88 |
| 2,741,757 | 4/1956 | Devol et al. | 323—56 |
| 2,773,198 | 12/1956 | Duinker | 307—88 |
| 2,795,706 | 6/1157 | Barker | 307—88 |
| 2,906,942 | 9/1959 | Mittag | 323—76 |
| 2,937,365 | 5/1960 | Peaslee | 318—162 |

OTHER REFERENCES

Say, M. G., Magnetic Amplifiers and Saturable Reactors, George Newnes Ltd., London, 1954, p. 178, Figs. 7–27.

JOHN F. COUCH, *Primary Examiner.*

ORIS L. RADER, MILTON O. HIRSHFIELD,
*Examiners.*